(12) United States Patent
Sundararajan et al.

(10) Patent No.: US 8,219,076 B2
(45) Date of Patent: Jul. 10, 2012

(54) CDMA PROBE FOR SELF-TESTING BASE STATION RECEIVERS

(75) Inventors: Ganesh Sundararajan, San Diego, CA (US); Edward Ken Kiu Mah, Kanata (CA); Neil McGowan, Stittsville (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1350 days.

(21) Appl. No.: 11/572,434

(22) PCT Filed: Jul. 19, 2005

(86) PCT No.: PCT/CA2005/001133
§ 371 (c)(1),
(2), (4) Date: Aug. 29, 2007

(87) PCT Pub. No.: WO2006/007714
PCT Pub. Date: Jan. 26, 2006

(65) Prior Publication Data
US 2008/0096543 A1 Apr. 24, 2008

Related U.S. Application Data

(60) Provisional application No. 60/589,352, filed on Jul. 20, 2004.

(51) Int. Cl.
*H04W 24/00* (2009.01)
*H04B 17/00* (2006.01)
(52) U.S. Cl. .................. 455/423; 455/226.1; 455/67.11; 455/67.14; 455/424; 455/425; 375/224
(58) Field of Classification Search .......... 455/420–427, 455/51.1, 51.2, 52.1, 115, 115.2, 67.11–67.7, 455/226.1–226.4; 375/224–228, 141
See application file for complete search history.

(56) References Cited

U.S. PATENT DOCUMENTS

| | | | | | |
|---|---|---|---|---|---|
| 3,648,248 | A | * | 3/1972 | Deman et al. | 341/139 |
| 5,572,510 | A | * | 11/1996 | Koivu | 370/252 |
| 6,034,950 | A | * | 3/2000 | Sauer et al. | 370/310.2 |
| 6,037,868 | A | * | 3/2000 | Oh et al. | 340/539.24 |
| 6,084,545 | A | * | 7/2000 | Lier et al. | 342/360 |
| 6,122,505 | A | * | 9/2000 | Genell et al. | 455/423 |
| 6,259,314 | B1 | * | 7/2001 | Liu et al. | 329/304 |

(Continued)

OTHER PUBLICATIONS

"Testing and Troubleshooting Digital RF Communications Receiver Designs", Application Note 1314, Agilent Technologies Inc., Mar. 25, 2002, entire document.

(Continued)

*Primary Examiner* — Kamran Afshar
*Assistant Examiner* — Mong-Thuy Tran
(74) *Attorney, Agent, or Firm* — Potomac Patent Group PLLC (57) ABSTRACT

An access probe existing and generated within a base station to simulate a mobile terminal for the purpose of testing base station receive functionality within a communications system. The access probe data is injected at baseband rather than at RF to eliminate the need for analog/RF circuitry. The access probe performs injection at the front end of the base station receiver to exercise as much receive data path as possible. A unique ID is embedded in the access probes so that the communications system is aware which probes within a sequence were received successfully and at what power level. Within in-field applications, the unique ID allows the communications system to distinguish simulated access probes from those corresponding to real mobiles.

22 Claims, 3 Drawing Sheets

Access Probe Block Placement in Receiver Front End

U.S. PATENT DOCUMENTS

| | | | |
|---|---|---|---|
| 6,308,072 B1 * | 10/2001 | Labedz et al. | 455/448 |
| 6,430,420 B1 * | 8/2002 | Johnson et al. | 455/561 |
| 6,564,349 B1 * | 5/2003 | Mitten et al. | 714/733 |
| 6,594,509 B1 * | 7/2003 | Takakusaki et al. | 455/562.1 |
| 6,697,618 B1 * | 2/2004 | Bullock et al. | 455/427 |
| 6,839,544 B1 * | 1/2005 | Johnson | 455/67.11 |
| 6,970,497 B2 * | 11/2005 | Hoshino et al. | 375/141 |
| 7,072,305 B1 * | 7/2006 | Gregson | 370/241 |
| 7,269,404 B2 * | 9/2007 | Yoneu | 455/403 |
| 7,463,899 B2 * | 12/2008 | Riley et al. | 455/514 |
| 2002/0119772 A1 * | 8/2002 | Yoshida | 455/423 |
| 2003/0162539 A1 | 8/2003 | Fiut | |
| 2004/0116111 A1 * | 6/2004 | Saunders | 455/423 |
| 2004/0184487 A1 * | 9/2004 | Kim | 370/516 |
| 2004/0203419 A1 * | 10/2004 | Crocker et al. | 455/67.11 |
| 2005/0026579 A1 * | 2/2005 | Yoneu | 455/147 |
| 2005/0208898 A1 * | 9/2005 | Wang et al. | 455/67.16 |

OTHER PUBLICATIONS

"Understanding CDMA Measurements for Base Stations and Their Components", Application Note 1311, Agilent Technologies Inc., Jun. 1, 2000, pp. 3-10, 29-34.

International Preliminary Report on Patentability for International Application No. PCT/CA2005/001133, issued Jan. 23, 2007.

International Search Report for PCT/CA2005/001133, mailed Nov. 16, 2005.

* cited by examiner

Functional View of Access Probe Generator Block

CDMA PROBE FOR SELF-TESTING BASE STATION RECEIVERS

CROSS REFERENCE TO RELATED APPLICATIONS

This application claims the benefit of priority of U.S. Provisional Patent Application No. 60/589,353 filed Jul. 20, 2004, which is incorporated herein by reference.

FIELD OF THE INVENTION

The present invention relates generally to a method and apparatus for testing a base station within a wireless communications network. More particularly, the present invention relates to a probe for self-testing a base station receiver within a code division multiple access (CDMA) communications network.

BACKGROUND OF THE INVENTION

As with most communication systems, a receiver within a CDMA communications network is more challenging to design and test than the corresponding transmitter. In the following text the term CDMA refers to both the CDMA family of standards (e.g., IS-95, IS-2000, etc.) as well as the code division multiple access technology in general. Transmit functionality is relatively straightforward to implement based on standard CDMA specifications. Although performance targets are specified for the receiver, the actual design configuration is left to the communication system's provider to implement. A difficulty arises with the reverse link where the reverse data is received from a mobile via a radio frequency (RF) link and it is not possible to control the baseband data sent to the modem. This uncontrollability leads to unreliable debugging capabilities of the reverse link. Most of the existing debugging methodology for the reverse link either involves using some sort of access probe (i.e., a mobile transmission attempt) in the form of either a real mobile or a mobile simulator. While adequate for basic testing, these solutions have been not accurate enough for debugging any issues with the reverse link. Hence, an accurate diagnostic tool is needed to provide a deterministic signal that can be used for accurate debugging capability.

In field operation, there exists a "sleepy" base station problem in situations where a given sector on the base station may stop detecting valid access probes from mobiles. Here, the preamble portion is detected and either some or all of the message capsule is received by the modem. However, the reassembled Layer 2 encapsulated PDU fails the CRC check that is embedded in the frame. Consequently, the system discards the received frame data. Because all the access probes are like this when the system is in a bad state, no new calls can be handled. The system loading will decrease to zero as pre-existing calls are dropped. The system lies in a dormant state until the sector is re-initialized on the modem. The cause of this problem remains not well understood. Although the occurrence of the problem is rare, the field impact is quite serious. There may be no service for days or weeks in a given sector as long as the condition remains undetected by the wireless operator. Given the severity of having the system dwell in a bad state for prolonged periods of time before it is corrected via manual intervention, it is imperative to provide a detection mechanism for the sleepy base station issue.

Oftentimes, communications systems cannot detect mobiles (i.e., access probes) in close relation to the base station. Here, if the search window is not set correctly on the base station modem then the system might not be able to detect mobiles that are close to the base station RF antenna. In such instance, there is a hole in the coverage region centered around the RF antenna. This can happen if the calibration tables in the modules are incorrect or if the wireless operator has entered a wrong delay value for the system. This will result in a wrong calculation for forward distribution delay/reverse distribution delay (FDD/RDD) causing the base station modem to start correlating the received signal at a point that is too late in time to see the mobile signal. Effectively, mobiles close to base station have less than zero path offset relative to forward link timing which leads them to be undetected.

Still further, verifying CDMA system operation has been ineffective using either an actual mobile or existing mobile simulators as access probes. The timing of the CDMA forward link is tied to a global positioning system (GPS) timing reference signal (called Even-sec. signal or 2-sec. signal in CDMA terms). Hence, the base station transmits signals that have a known fixed relationship with regard to absolute time. A vector spectrum analyzer (VSA) can be used to verify the integrity of the forward link physical layer of a base station. Many problems can be diagnosed using a VSA without the need for a mobile terminal (e.g., incorrect FDD setting, poor RF signal quality, baseband data corruption, etc.)

The timing of the CDMA reverse link, however, is derived from the forward link signal that the mobile terminal receives. The physical distance and time varying channel conditions between the transmitter and receiver adds both propagation delay and timing uncertainty to the reverse link. This can create problems when trying to determine whether or not the search window is set correctly in the receive modem. In general, debugging problems with the reverse link physical layer is difficult given the number of things that can go wrong (e.g., incorrect RDD setting, no RF signal going to the radio, wrong system configuration, etc.). This difficulty is inherent in CDMA signal processing because the noise-like property of these signals makes their detection, and hence the debugging of reverse link issues, a challenge. It is nontrivial to send a test signal over the reverse link in an open loop manner and have the base station (i.e., modem) detect such test signal. Proper timing synchronization and system parameter configuration are required at the signal source. Consequently, a specially devised mobile terminal is often used for reverse link testing. While this may suffice for lab test purposes, it is not feasible to deploy a test mobile with every base station for an in field test application as this adds significantly to the cost of the final product.

Yet still further, calibration of finger delay data in communications systems can be problematic. Accurate finger delay data is useful for verifying modem operation and for determining the position of the mobile terminal for location-based services. Because the timing of the access probe generator is tied to the even second reference signal (2-sec. or EVEN_SEC), such timing can be used to accurately calibrate finger delay data reported by the modem. For example, there is a slight difference in the finger delay values reported by various Channel Element Modules (CEMs). Also, there are delay variations in the system that depend on things such as HSSL timing and hardware initialization conditions (e.g., receive channelizer). These can introduce some variation in the hardware delays that may or may not be accounted for in the RDD.

It is important that any problem condition within the communications system be detected quickly. Although it might be possible for software to try to infer a problem condition by monitoring call logs, a detection method based on call statistics requires that sufficient data be gathered over a large time interval in order to make an accurate assessment. This implies that the system might dwell in a bad state for a relatively long time before a loss of service condition is recognized. Also, it is not possible to distinguish with certainty between a situation in which a system is not getting any call attempts because there are in fact no mobiles attempting to do so and that of a system being in a bad state. This ambiguity is inherent to CDMA due to the noise-like property of the received signal.

It is, therefore, desirable to provide a robust and cost-effective testing mechanism for setup and monitoring of CDMA base stations.

SUMMARY OF THE INVENTION

It is an object of the present invention to obviate or mitigate at least one disadvantage of previous CDMA base station testing mechanisms. The present invention embodies an access probe feature that is a diagnostic tool to test the reverse link detection capability of the base station. The present invention allows the system to do a self test of its receive modem functionality without the need for an actual mobile. This self-test may be performed during system setup (e.g., debugging) and/or subsequent continuous system monitoring. This enables software to implement a detect and reset strategy in order to mitigate problems. It should be understood that a variety of applications are possible for the access probe diagnostic tool.

The access probe feature in accordance with the present invention provides a stable reference signal to verify the setting for RDD both in the field as well as in the lab—i.e., uncontrolled and controlled environments. When using the access probe in accordance with the present invention, it should be understood that minor hardware variations in a CDMA base station introduces some variation in the delays that may or may not be accounted for in the RDD. Such variation can be determined accurately and can be factored in while calculating the RDD value within the present invention. This leads to increased reliability of the reverse link and in turn the reliability of the CDMA base station and network using the invention.

The access probe in accordance with the present invention enables quick detection of a problem condition because the system can invoke the test any time. The system is aware that there is an access probe signature present in the received signal that should be detected by the modem. Failure to detect the signature after a few attempts indicates a problem with the system. Hence, regular insertion of access probes in accordance with the present invention within the reverse link signal can be perceived as a "heartbeat-like" signal that the system monitors to determine receive modem system integrity. For testing purposes, a unique identifier (ID) for test purposes is used. In order for the system not to waste resources at upper layers of software on servicing "fake" access probes (versus ordinary mobiles within the given cell), it is necessary for the system to be able to identify these access probes as not belonging to any real mobile out in the field. This is accomplished by embedding a unique ID in the access probes that can be used to distinguish the fake probes from real ones. Counter information is also embedded in the payload of the packet to identify which access probes within a sequence (and at what power level) were detected by the modem.

In a first aspect, the present invention provides a method for testing a receiver of a base station in a wireless communications network including injecting access probe data simulating actual data from a mobile communications device into the base station receiver at a point after analog to digital conversion and providing the access probe data with a unique identifier so that the access probe data is distinguishable against actual data from a mobile communications device being received simultaneously by the base station.

In a further embodiment, there is provided an apparatus for testing the receiver of a base station in a wireless communications network including an access probe data generator for generating simulated data substantially the same as actual data received at a base station receiver from a mobile communications device, means for injecting the access probe data into the base station receiver at a location after an analog to digital converter, and means for attaching a unique identifier to the access probe data.

Other aspects and features of the present invention will become apparent to those ordinarily skilled in the art upon review of the following description of specific embodiments of the invention in conjunction with the accompanying figures.

DETAILED DESCRIPTION

Generally, the present invention provides a method and system for generating simulated mobile terminal access probes (i.e., "fake" access probes) for the purpose of testing base station receive functionality. In accordance with the present invention, the simulated access probe data is advantageously injected at baseband rather than at RF to eliminate any need for additional analog/RF circuitry. Such injection is performed at the front end of the receiver to exercise as much receive data path as possible. A unique ID is embedded within the access probes so the given CDMA system knows which probes within a sequence were received successfully and at what power level.

The unique ID allows a CDMA system to distinguish fake access probes from those corresponding to real mobiles (for in-field application versus in-lab testing). Location of access probe data injection is of importance as the data injection must be done after analog to digital conversion (ADC), but before receive filtering, AGC, and quantization. Injection after ADC allows data injection at baseband whereas injection at any point prior to that would necessitate additional circuitry to implement the present invention. Injection before receive filtering is done in order to band limit (pulse shape) the injected signal. This eliminates the need for a separate transmit filter to be applied on the simulated mobile transmission (i.e., fake access probe). Injection before AGC is done so as not to change the average signal power going into the modem. Otherwise, receiver demodulation performance would be degraded.

The preferred method of access probe data insertion can be either summation with the existing signal or substitution for the existing signal. Summation is necessary for in service test capability. Substitution is necessary for bit exact test capability. Timing of access probe block is synchronized to system even second. This enables accurate timing measurements to be made whereas using a real mobile terminal can introduce significant variation in measurement. The physical access probe block is embedded within a receive channelizer application specific integrated circuit (ASIC) which therefore allows for minimal hardware implementation issues. Such placement results in minimal incremental cost to build the present invention into a CDMA system. A software interface is provided to allow the present inventive device to be configured. Such software details would be considered readily apparent to one of ordinary skill in the software art and such details are not further described in detail. CDMA system parameters are normally transmitted to a mobile terminal via forward link overhead channels. By providing these parameters to the access probe block via software control, it is not necessary to process the forward link signal to extract these system parameters.

In order for the system to not waste resources at upper layers of software on servicing fake access probes, it is necessary for the system to be able to identify these access probes as not belonging to any real mobile out in the field. As mentioned, this is accomplished by embedding a unique ID in the access probes that can be used to distinguish the fake probes from real ones. Counter information is also embedded in the payload of the packet to identify which access probes within a sequence (and at what power level) were detected by the modem.

In a CDMA system, the access channel is used by the mobile station to communicate with the base station when the mobile is not in a call. It is how the mobile station initiates call origination or sends page response and other messages to the network. It is often also the minimum channel that is needed to get a response from the modem in the base station. The CDMA standard allows for up to 32 access channels per frequency assignment. Other access channel parameters are shown in Table 1 below. Different long code pseudo-noise (PN) sequences are used to identify these channels. The access channel has a data rate of 4800 bps. This bandwidth is shared at different times by multiple mobiles in the system. If two or more mobiles attempt to send a message over the access channel simultaneously then a collision occurs resulting in lost data. A random access scheme is used by the mobiles to enable communication over the shared channel. If a collision occurs then the mobiles will back off for different periods before attempting retransmission. The wait duration is chosen pseudo-randomly to avoid another collision situation.

TABLE 1

Access Channel Modulation Parameters for Spreading Rate 1

| Parameters | Value | Units |
| --- | --- | --- |
| Data Rate | 4,800 | bps |
| PN Chip Rate | 1.2288 | Mcps |
| Code Rate | 1/3 | bits/code symbol |
| Code Symbol Repetition | 2 | repeated code symbols/code symbol |
| Repeated Code Symbol Rate | 28,800 | sps |
| Modulation | 6 | repeated code symbols/modulation symbol |
| Modulation Symbol Rate | 4800 | sps |
| Walsh Chip Rate | 307.20 | kcps |
| Modulation Symbol Duration | 208.33 | µs |
| PN Chips/Repeated Code Symbol | 42.67 | PN chips/repeated code symbol |
| PN Chips/Modulation Symbol | 256 | PN chips/modulation symbol |
| Transmit Duty Cycle | 100.0 | % |

As mentioned above, every transmission attempt from a mobile is generally called an access probe. It is comprised of a number of R-ACH preamble frames followed by a number of R-ACH message capsule frames. The access probe of the present invention is, however, a "fake" signal generated to mimic an actual mobile transmission attempt. The preamble frames contain all zeros data. They are used for channel estimation and detection purposes at the receiver thereby preparing it to receive the message capsule frames that follow afterwards. The message capsule contains a Layer 2 encapsulated PDU with zero padding as required. The number of frames allotted for preamble and message capsule, 3+PAM_SZs and 1+MAX_CAP_SZs respectively, are system parameters. System parameters are conveyed to the mobile via the forward link overhead channels. Access probe transmissions are aligned to the R-ACH slot boundary which itself is aligned to the even second boundary. The length of a slot is equal to 4+PAM_SZs+MAX_CAP_SZs frames where one frame is 20 millisecond (ms) in duration. It should be understood that the formation of R-ACH frames is well documented in the physical layer section of the CDMA standard and need not be further discussed herein.

Several access probes grouped together are called an access probe sequence. The number of access probes which form a sequence, NUM_STEPs, and the delay between successive access probes, TA+RT, are also system parameters. The power is increased after each access probe to improve the likelihood of the message reaching the base station. Note that the initial power (IP) and the power increment (PI) for the sequence are determined by the system. At a certain power level, the preamble frames will be detected above the noise floor of the receiver. A threshold setting at the receiver determines at what level the modem decides that a correlation peak in the search window corresponds to a potential access probe attempt from a mobile. The optimum threshold is a compromise between missing some valid access probe attempts (i.e., detection failure) and being overly sensitive to noise in the system (i.e., false detection). If the preamble frames are detected, then the modem will try to decode the message capsule frames that follow. An access probe is deemed to have been received correctly if a cyclical redundancy check (CRC) of the message capsule passes. The contents of the Layer 2 encapsulated PDU contains, among other things, information about the mobile required to establish communication with the base station. A protocol revision number is included in the header portion of the PDU to specify how the bits following the protocol revision number are to be interpreted. The exact contents of the PDU under normal operation are well documented in the MAC/LAC sections of the CDMA standard and need not be further discussed herein.

It is possible to insert access probes in accordance with the present invention into the reverse link in order test the base station modem's detection capability. An access probe that is valid from a physical layer point of view is the minimum input stimulus in the reverse link that can generate a meaningful response from the modem. The modem API will signal to CEM software that a R-ACH frame was received and provide the decoded data. The modem API leaves the task of interpreting the R-ACH frame data to CEM software. Hence, the R-ACH frame data does not necessarily have to be valid from a MAC/LAC point of view for detection purposes. The payload may or may not correspond to a Layer 2 encapsulated PDU. However, it is advantageous for cost and efficiency purposes to reuse the existing detection mechanisms in CEM software. This includes the reassembly of message capsule fragments and CRC checking of the data. A means of identifying these fake access probes is required so as not to have the system pass on the invalid PDU information to upper layers. This is accomplished by using a combination of invalid protocol discriminator and message identification in the PDU header. While the particular choice is not vital, it must be unique and not possible to be associated with any actual mobile in the field. CEM software will search for this identifier and flag it as being a fake access probe. Also, it is necessary to distinguish fake access probes from randomly generated responses due to noise. This is accomplished by employing the CRC mechanism already in place.

The insertion of fake access probes can generally be done at any point in the reverse link at RF or at digital baseband with preference given to placement that would reduce the hardware resources needed for implementation. As already mentioned, insertion of access probe data at baseband (i.e., after ADC) is advantageous because it does not necessitate the use of additional RF components. A minimal implementation is important for being able to realize a system feature considered generally non-critical for normal operation. Another consideration is the desire to locate the point of insertion as close to the front end of the reverse link as possible so as to provide maximum test coverage in the system. Consequently, the receiver channelizer ASIC within the radio module is the preferred location within the system to embed a fake access probe generation block in accordance with the present invention. Moreover, the precise point of insertion is important so as to enable use of the fake access probes as an in-service test in the field. Such in-service testing environments require that the access probe data is filtered to contain energy within the allowed spectrum and does not change the average power in the baseband signal. Otherwise, modem performance is affected negatively.

Figure 1:
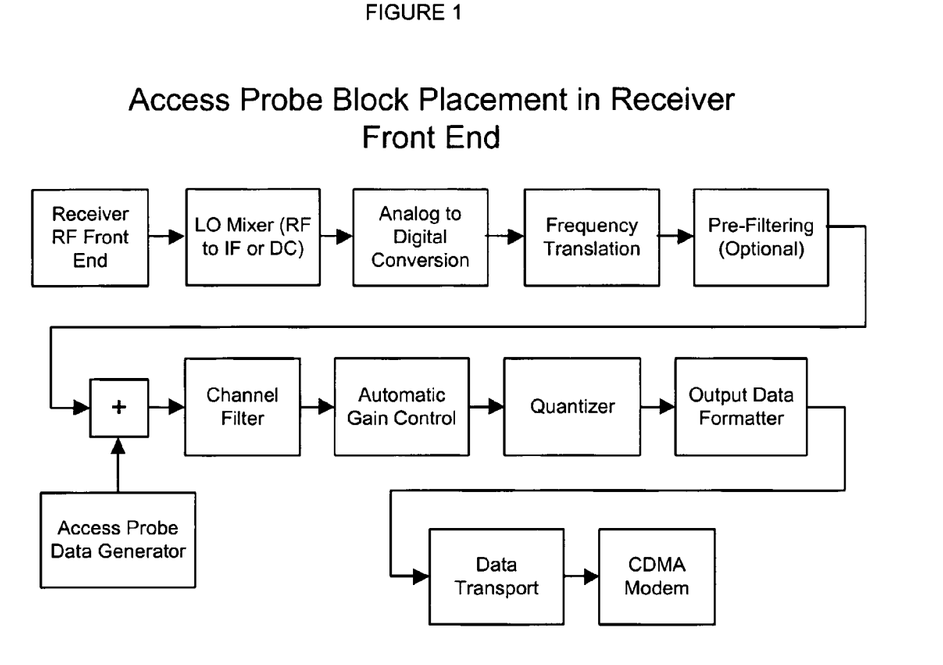
FIG. 1 is a flowchart showing placement of the access probe block in accordance with the present invention within a base station receiver.

To satisfy the above requirements, the ideal location for data insertion in the receive channelizer immediately prior to receive filtering (which is also before Automatic Gain Control (AGC) and 4-bit/5-bit quantization) as shown in FIG. 1. This allows reuse of the existing receive filter to mimic the transmit filtering required of mobile transmissions. Not including the effect of the transmit filter response will result in an increase in inter-chip interference. That response will not include the effect of the wireless channel which is a much harsher impairment in itself. This also avoids the problem of changing average power because the AGC will track the increased power in the baseband signal due to access probe insertion. Changing the average power of the baseband signal would be detrimental to receive demodulation performance because certain modem thresholds are set on an absolute scale. The threshold settings would be destabilized effectively. Further, placing the insertion point before quantization in the receive channelizer allows for data injection at high precision. Otherwise, choosing any point in the data path after 4-bit/5-bit quantization would necessitate the use of interpolation filters and this would be undesirable for signal to noise ratio (SNR) reasons and costly in terms of hardware required.

With further reference to FIG. 1, the access probe block is shown in terms of a flowchart including where access probe data generation is inserted. A typical receiver front end will include a receiver RF front that will accept the RF signal. The RF signal will then be processed by a mixer and ADC along with frequency translation and optional pre-filtering. Thereafter, in accordance with the present invention, the signal path will include injection of the access probe data. Further processing includes typical channel filtering, AGC, quantization, data formatting and transport to the CDMA modem. In this manner, little additional circuitry is needed. The receive filter essentially forms the pulse shaping. It should be understood that the access probe generation block requires an interface to permit configuration via software control and synchronization to even second pulse by provision of the even second pulse to be routed to the access probe generator block.

The present invention requires use of existing system parameters including, among others, system time, long code state, protocol revision, and paging channel. Such parameters are conveyed over the forward link via the sync channel message. Where no tie between forward and reverse link exists, these system parameters must be provided to the access probe generator block explicitly, that is, via register settings. Such parameters are detailed in Table 2 below.

TABLE 2

SYSTEM PARAMETERS FOR ACCESS PROBE GENERATOR

| System Parameter | Description |
| --- | --- |
| Access channel | Used for generation of access channel. Creation of ACH mask is function of |
| Long code mask | ACN, PCN, BASE_ID, PILOT_PN. Value must correspond to that of system. |
| Long code state | Used for direct sequence spreading. LC state loaded on even second boundary. Value must correspond to actual system time. |
| Short code I state | Used for quadrature spreading of I branch. SC-I state loaded on even second boundary. Normally set to 4000 h. |
| Short code Q state | Used for quadrature spreading of Q branch. SC-Q state loaded on even second boundary. Normally set to 4000 h. |
| Channel gain | Gain of first access probe in access probe sequence. Care must be taken not to overwhelm received signal. Should be based on power measurement in RX channelizer. Value is typically set so that the first access probe is marginally decodable by modem. |
| Channel gain increment | Incremental gain, on a linear scale, for successive access probes in access probe sequence. Care must be taken not to overwhelm received signal. Value is typically set so that the last access probe is decodable without errors by modem. |
| Preamble size | Specifies length of preamble portion of access probe. Affects the access slot size. Value must correspond to that of system. |
| Message capsule size | Specifies length of message capsule portion of access probe. Affects the access slot size. Value must correspond to that of system. |
| Backoff delay | Specifies the time interval between successive access probes within an access probes sequence. Measured in terms of R-ACH slots. |
| Persistence delay | Specifies the start of the R-ACH slot boundary relative to (delayed/advanced) even second. Measured in terms of R-ACH slots. |
| Number of steps | Specifies the number of access probes forming an access probe sequence |
| Sample select | Specifies the number of access probes forming an access probe sequence |

TABLE 2-continued

SYSTEM PARAMETERS FOR ACCESS PROBE GENERATOR

| System Parameter | Description |
| --- | --- |
| Even second skew | Specifies timing offset relative to even second. Used to compensate for FDD/RDD and/or to simulate propagation delay. Value is typically set so that the timing of the access probes are within the search window of the modem. Enables testing of boundary conditions. Normally positive valued. |
| PDU header | Used to distinguish fake access probes from real ones. Must not correspond to an actual mobile. The first 26 bits of the PDU is software configurable with the rest reserved for containing counter information. |

There are several operational aspects of the fake access probe generator of the present invention. Gain increment is usually on a dB scale as per the CDMA standard. However, a linear scale is used within the present invention in order to simplify hardware implementation. The trade-off is that channel gain increment is now a function of the instantaneous channel gain for a given increase on a dB scale. This conversion must be managed by software. There is no randomization of delays normally done for real access probes (e.g., R-ACH number, PN randomization delay, sequence backoff, probe backoff). Fake access probes are generated deterministically at regular intervals in time. The time span for an access attempt is limited to one even second interval. The number of access sub-attempts per access attempt is limited to one. The number of access probe sequences per access sub-attempt is limited to one. Termination of the access probe sequence upon acknowledgement from the base station is possible, but this is done via software control of the access probe generator, not via the paging channel in the forward link.

Architecturally, the access probe generator block in accordance with the present invention can be broadly divided into a pipeline of two sections: a bit pre-processing section and a chip processing section. Illustrated by FIG. 2, the architecture of the bit pre-processing section contains an access channel source, encoder, symbol repetition, and block interleaver. The chip processing section contains Walsh chip generation, long-code user mask and PN_BIT generation, stage-1 of the data pipe, short code generation (both I and Q), and the channel gain sign shifter.

Figure 2:
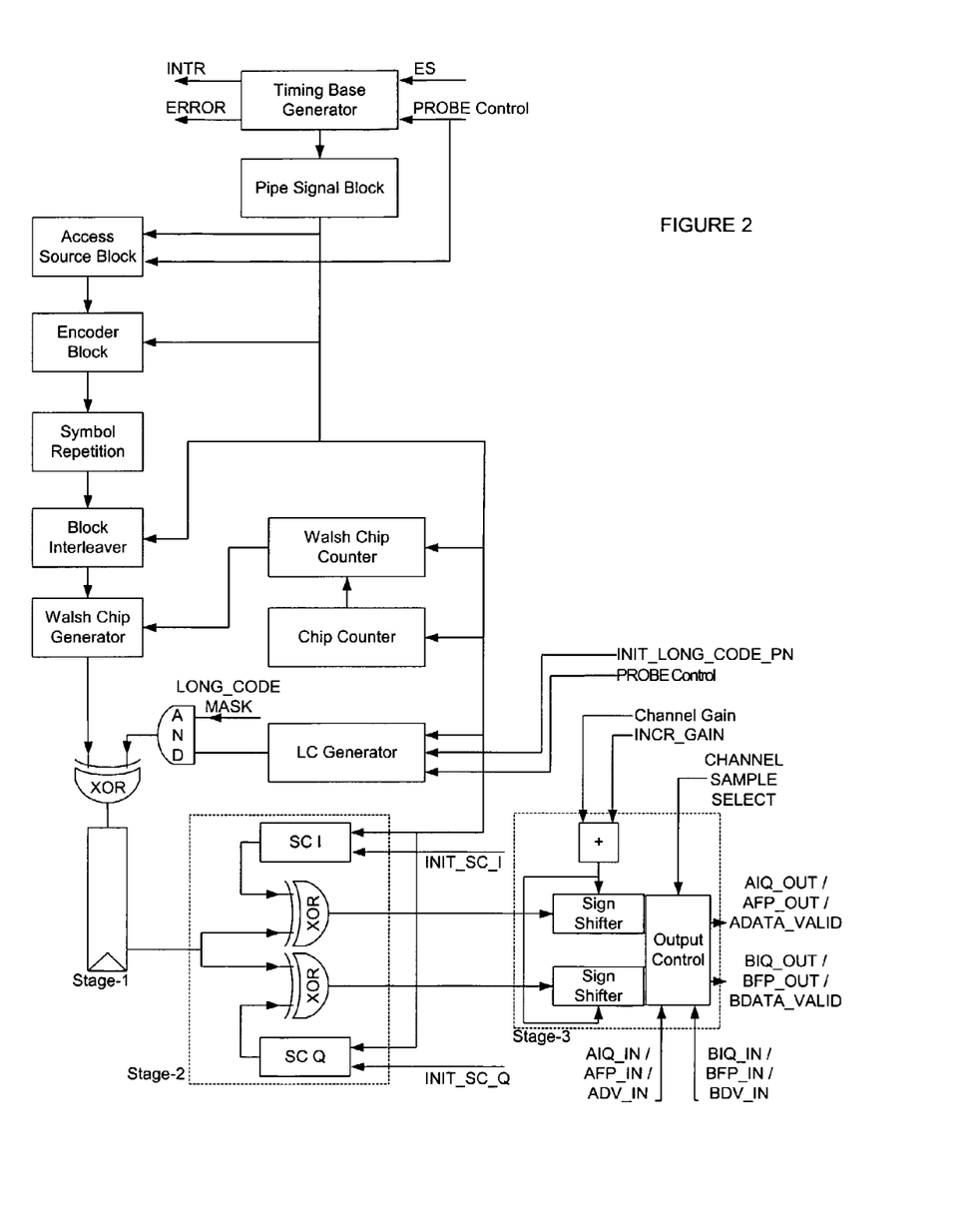
FIG. 2 is an architectural view of the access probe in accordance with the present invention.

With continued reference to FIG. 2, the timing base generator (TBG) block synchronizes the access probe block with the rest of the system. The TBG block uses the external 2-sec. pulse sent to it to synchronize the operation of the access probe block. The TBG block uses the path offset value to determine the system init time. The path offset has a range from 0->1023 chips. This determines when the internal ES boundary starts for the access probe block. If the path offset is set to 0, then it means the internal EVEN_SEC_TICK is lined up with the external EVEN_SEC. If it is set to 1, then it means the internal EVEN_SEC_TICK is 1-chip delayed from the external EVEN_SEC and so on. The pipe signal block receives the control signals from the TBG block and delays them so as to line-up with all the downstream block requirements.

The access source block is responsible for generating the 96-bit (88 information bits+8 tail bits) access channel source that form an access probe. The access source block generates two types of bit-stream that is sent by the access probe. They are the preamble bit-stream and the message capsule bit stream. The preamble bit-stream is a stream of 88 0's followed by 8 tail bits; the tail bits are once again 0's. The bit-stream structure for the message capsule is a MSG_LENGTH of 8 bits in octets followed by a PDU-_HEADER of 26 bits that are software configurable followed by a PKT_COUNTER of 24 bits that enumerates the 20 ms frame within a 2-sec period followed by a CRC of 30 bits. The actual message capsule consists of a series of multiple bit-stream structures described above. The MSG_LENGTH and PDU_HEADER are determined by the software and are constant over the entire MESSAGE_CAPSULE period. The PKT_COUNTER consists of 4 fields. The fields are:

1) 20 MS Frame Counter. This is a 7-bit field that carries the current count of the number of 20 ms within the 2-sec period. It has a range from 0 to 99.

2) SEGMENT field. The 3-bit segment field carries the current count of the number of 20 ms within the message capsule. It has a range from 0 to 7.

3) Access probe number. This is a 4-bit field that carries the current access probe number within the access probe sequence. It has a range from 0 to 15.

4) Reserved. This 10-bit field is set to 0.

The 30-bit CRC filed is filled as follows. If the current 20 ms slot in the message capsule is not the last slot, then the CRC field is filled with 1's. If the current 20 ms period in the message capsule if the last slot, then the CRC field is filled with the 30-bit CRC from the CRC polynomial. The CRC polynomial is $g(x)=x30+x29+x21+x20+x15+x13+x12+x11+x8+x7+x6+x2+x+1$. The CRC polynomial is a straight-forward implementation of the CDMA-2000 standard.

During the start of the message capsule slot, the registers of the CRC polynomial are loaded with 1's. Then for every 20 ms slot in a message capsule except the last slot are sent into the CRC polynomial (this includes the intermediary CRC bits set to 1). During the last 20 ms slot of the message capsule, the bit-stream up to PKT_COUNTER is clocked into the polynomial. After all the bits are passed through, then the CRC is frozen and the bits are shifted out of the polynomial to fill the CRC slot.

Figure 2A:
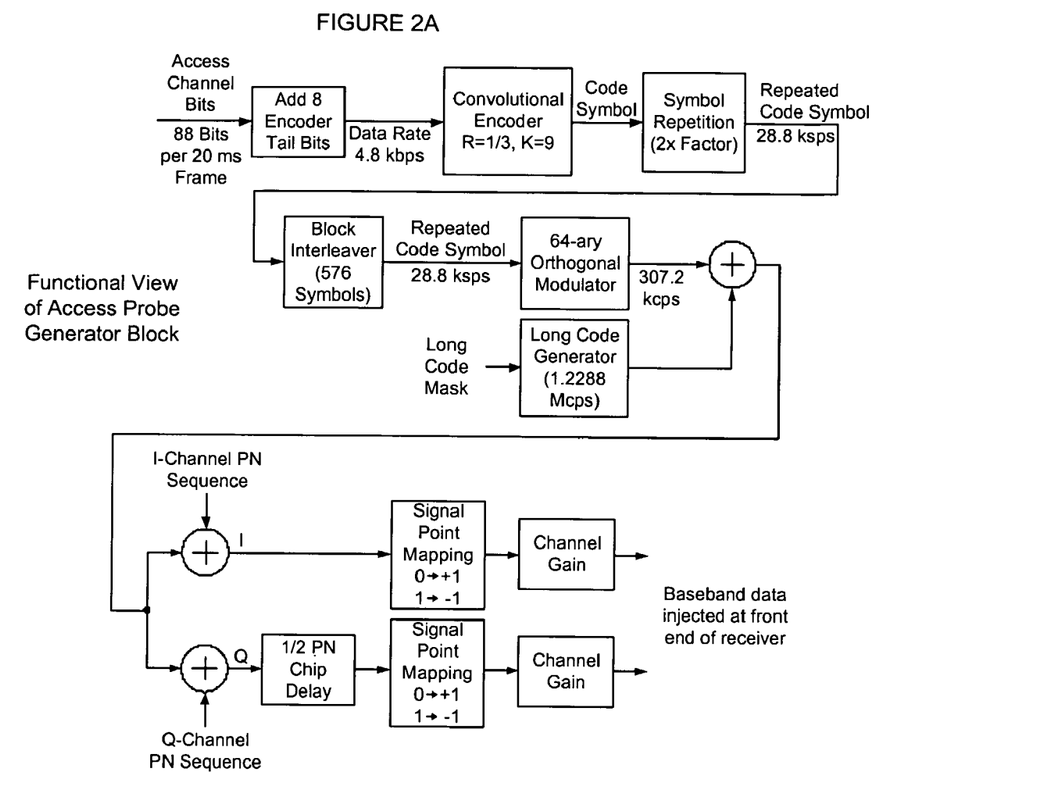
FIG. 2A is a functional view of the access probe in accordance with the present invention.

The encoder block within the access probe is a straightforward implementation of the K=9, rate ⅓ convolution encoder as known within the CDMA-2000 standard. The 88 information bits along with the 8-tail bits from the access source block are serially fed into the encoder block. Functionally, this is shown in FIG. 2A. The encoder block is cleared during the start of a 20 ms boundary. Also, the 8 tail bits of the encoder ensure that the state is cleared at the end of 20 ms frame. The data rate from the access source block is tripled to get an outgoing data rate of 14.4 ksps (3*4.8). The incoming 96-bits from the source module are tripled to 288 bits and passed to the symbol repetition block.

The symbol repetition block is responsible for performing the x2 symbol repetition to increase the data rate from 14.4->28.8 ksps. The symbol repetition block increases the data rate by repeating each of the convoluted symbol 2-times and storing them in a register file. In the process, the 288 incoming bits are doubled into 576-bits for the block interleaver to extract them.

The block interleaver module is responsible for performing the block-interleave function as required by the CDMA-2000 standard. The block interleaver in the access probe performs the following arithmetic to determine the interleave sequence of the output bits.

$$A_i = 2^m(i \bmod j) + BRO_m(\lfloor i/j \rfloor),$$

where $A_i$ is the address of the interleaved output bit($i$=0 to 575)

$j$=18

$m$=5

$BRO_m(y)$=Bit-reversed m-bit value of $y$(where $m$=5)

As earlier described, the symbol repetition block sends 576-bits to the block interleaver. The block interleaver block is then responsible for outputting the 6-bit modulation index (labeled WALSH_CODE) for the Walsh chip generator to generate the 64-bit WALSH chip sequence as required by the access probe. The block interleaver is responsible for generating a new 6-bit WALSH_CODE every 256 1 FC periods. The Walsh chip generator generates a new Walsh chip every 4 1 FC periods. Because there are 64 WALSH CHIP bits that need to be generated for every WALSH_CODE, the block interleaver needs to generate a new WALSH_CODE 64*4=256 chips.

The block interleaver has 3 counters that perform the block interleaver function. The counters are:

1) Chip counter. This counter counts the 256 1 FC period to keep track of generation of new WALSH_CODE every 256 chip periods.

2) MOD18 Counter. This counter keeps track of number of 256 chip periods within a 20 MS and performs a MOD18 function. Since we are required to generate 6 index bits (or addresses) every 256-chips. This counter goes through 0->6->12->0->... sequence 3) DIV18 counter. This counter keeps track of number of 18 256 chip periods within a 20 MS period.

All the counters are reset on the 20 MS_TICK (20 MS boundary)

Within the Walsh chip generator, the WALSH_BIT_SEQ module is responsible for generating the WALSH_CHIP sequence for the selected modulation SYMBOL index (WALSH_CODE). The access probe is capable of generating any modulation SYMBOL index sequence within 0 to 63. The WALSH_CHIP is provided by a linear counter external to the generator. This WALSH_CHIP_COUNTER increments every 4-chip periods. The WALSH_CODE from the block interleaver is held for 256 chip-periods at a constant value so that the WALSH Bit generator generates all the required 64-bit sequence for the given CHANNEL.

The WALSH_CODE generated from the block interleaver forms the row-index to the WALSH_BIT table, and the internal 6-bit WALSH_CHIP counter (synchronized with the access probe EVEN_SEC) forms the column-index to the WALSH_BIT table. Each entry in the WALSH_BIT table is one-bit in size. As described in the TIA/EIA/IS-2000.2.B standard, the WALSH_BIT sequence is built using known formulae. The IS-2000 specification gives details of the 64×64 orthogonal matrix ($H_{64}$) and those details will not be reproduced here.

The long-code (LC) generation block generates the long-code PN sequence bit used in the datapath chain. The long-code polynomial is the heart of the long-code generator. The LC polynomial used for LC generation is: $p(x) = X^{42} + X^{35} + X^{33} + X^{31} + X^{27} + X^{26} + X^{25} + X^{22} + X^{21} + X^{19} + X^{18} + X^{17} + X^{16} + X^{10} + X^7 + X^6 + X^5 + X^3 + X^2 + X^1 + X^0$. The LC generator is a 42-bit linear shift register that shifts data on a CHIP boundary (1 FC). The contents of the shift register are latched on to the output register on every 1 FC boundary to be used for generation of USER_MASK. The 42-bit LC generator state is ANDed with the 42-bit LONG_CODE_MASK. The 42-bit result is then bit-wise XORed to generate the PN_BIT. The PN_BIT generated is XORed with the WALSH_BIT to generate the data to the stage-1 of the data pipeline.

Stage 2 includes the short code (SC) generation. The data from the stage-1 is now split into 2 streams as I and Q bits. The I branch is XORed with the output of the I-short code generator and the Q branch is XORed with the output of the Q-short code generator. This forms the output of the stage-2. Both are sent to the channel gain sign conversion stage. The SC polynomial (15-bit value) is loaded by the microprocessor by asserting the LOAD_PENDING signal. The SC polynomial is then shifted every 1 FC tick. The PN-BIT is the most significant bit (MSB) of the SC polynomial output every 1 FC. The SC polynomial is:

$$P_I(I) = X^{15} + X^{13} + X^9 + X^8 + X^7 + X^5 + 1$$

$$P_Q(I) = X^{15} + X^{12} + X^{11} + X^{10} + X^6 + X^5 + X^4 + X^3 + 1$$

The SC polynomial is embodied in a 15-bit linear feedback shift register that shifts data on a CHIP boundary (1 FC). The contents of the shift register are latched on to the output register on every 1 FC boundary to be used for generation of PN_BIT (MSB bit is used as the PN-BIT).

The channel gain stage is a sign changer block in the data path. An auto-increment function is implemented in the channel gain stage to increment the channel gain value for each access probe in the access probe sequence.

The output control block is responsible for adding the channel gain stage output into the selected channel defined within the selected sample, adding the input data with the access probe data before being sent to the subsequent block of the receive channelizer, and introducing ½ chip delay between the I and Q data-stream from the access probe.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for testing a receiver of a base station in a wireless communications network, said method comprising:
   injecting access probe data simulating actual data from a mobile communications device into said base station receiver at a point after analog to digital conversion; and
   providing said access probe data with a unique identifier so that said access probe data is distinguishable against actual data from a mobile communications device being received simultaneously by said base station.

2. The method as claimed in claim 1, further including a step of repeating said injecting and providing steps with successively higher power levels.

3. The method as claimed in claim 2, wherein said injecting step includes injecting said access probe data into said base station receiver at a point prior to receiver filtering.

4. The method as claimed in claim 3, wherein said injecting step includes injecting said access probe data into said base station receiver at a point prior to automatic gain control.

5. The method as claimed in claim 4, wherein said injecting step includes injecting said access probe data into said base station receiver at a point prior to quantization.

6. The method as claimed in claim 1, further including a step of repeating said injecting and providing steps with successively varied access probe characteristics.

7. The method as claimed in claim 6, wherein said successively varied access probe characteristics include simulated path delay.

8. The method as claimed in claim 6, wherein said successively varied access probe characteristics include simulated gain.

9. The method as claimed in claim 6, wherein said successively varied access probe characteristics include simulated fading.

10. The method as claimed in claim 1, further including, upon detection of failure of a modem of said base station to recognize said access probe data, a step of resetting said base station.

11. The method as claimed in claim 1, further including, upon detection of failure of a modem of said base station to recognize said access probe data, a step of flagging a system alarm.

12. An apparatus for testing the receiver of a base station in a wireless communications network, said apparatus comprising:
an access probe data generator for generating simulated data substantially the same as actual data received at a base station receiver from a mobile communications device;
means for injecting said access probe data into said base station receiver at a location after an analog to digital converter; and
means for attaching a unique identifier to said access probe data.

13. The apparatus as claimed in claim 12, further including means for modifying power level of said access probe data.

14. The apparatus as claimed in claim 12, further including means for modifying operational characteristics of said access probe data.

15. The apparatus as claimed in claim 14, wherein said operational characteristics are selected from a group consisting of simulated path delay, simulated gain, and simulated fading.

16. The apparatus as claimed in claim 12, wherein said means for injecting includes injecting said access probe data into said base station receiver at a point prior to receiver filtering.

17. The apparatus as claimed in claim 12, wherein said means for injecting includes injecting said access probe data into said base station receiver at a point prior to automatic gain control.

18. The apparatus as claimed in claim 12, wherein said means for injecting includes injecting said access probe data into said base station receiver at a point prior to quantization.

19. The apparatus as claimed in claim 12, further including a means for detecting failure of a modem of said base station to recognize said access probe data and a means for resetting said base station.

20. The apparatus as claimed in claim 12, further including a means for detecting failure of a modem of said base station to recognize said access probe data and a means for flagging a system alarm.

21. A device comprising:
an access probe data generator for generating an access probe having simulated data that is substantially the same as actual data received at a base station receiver from a mobile communications device;
the access probe data generator to connect to inject the access probe into the base station receiver at a location after an analog to digital converter; and
wherein the access probe includes a unique identifier.

22. A system comprising:
a base station receiver having a signal path including an analog to digital converter;
an access probe data generator coupled to the signal path downstream from the analog to digital converter to generate an access probe having simulated data that is substantially the same as actual data received at a base station receiver from a mobile communications device, wherein the access probe includes a unique identifier.

* * * * *